United States Patent [19]
Kohan

[11] Patent Number: 5,197,707
[45] Date of Patent: Mar. 30, 1993

[54] ISOLATION PLATFORM AND METHOD

[76] Inventor: Barry A. Kohan, 5024 Beckley Ave., Woodland Hills, Calif. 91364

[21] Appl. No.: 737,381

[22] Filed: Jul. 29, 1991

[51] Int. Cl.$^5$ ............................................. F16M 1/00
[52] U.S. Cl. .................................. 248/638; 248/562; 248/636
[58] Field of Search ............... 248/560, 562, 618, 619, 248/632, 633, 634, 638, 636; 312/7.1, 8

[56] References Cited

U.S. PATENT DOCUMENTS

| | | | |
|---|---|---|---|
| 2,777,902 | 1/1957 | Goldmark | 312/8 X |
| 3,469,809 | 9/1969 | Reznick | 248/638 X |
| 3,526,444 | 9/1970 | Carcel | 248/638 X |
| 3,782,801 | 1/1974 | Zimmermann | 312/8 X |
| 3,908,940 | 9/1975 | Stricht | 248/638 X |
| 4,469,303 | 9/1984 | Snyder | 248/634 |
| 4,652,495 | 3/1987 | Sato | 248/634 X |

FOREIGN PATENT DOCUMENTS 0021240  1/1989  Japan ................................. 248/638

Primary Examiner—J. Franklin Foss
Attorney, Agent, or Firm—John S. Christopher

[57] ABSTRACT

An isolation platform for use with an entertainment system component having a plinth for supporting the entertainment system component and a granular vibration absorption medium for dissipating mechanical vibrations. The granular vibration absorption medium is in communication with the plinth for isolating the entertainment system component from mechanical vibrations. A base structure is provided for containing the granular vibration absorption medium. The isolation platform functions to isolate the entertainment system component from mechanical vibrations to prevent degradation of performance of the entertainment system component. The base structure includes a plurality of shock-absorbing support feet for absorbing mechanical vibrations. A gap is located between the plinth and the base structure for minimizing the transfer of mechanical vibrations between the plinth and the base structure. The gap is filled with the granular vibration absorption medium.

14 Claims, 1 Drawing Sheet

ISOLATION PLATFORM AND METHOD

BACKGROUND OF THE INVENTION

1. Field of the Invention

The present invention relates to isolation platforms. More specifically, the present invention relates to methods and apparatus for isolation platforms of the type which dissipate mechanical vibrations in home and professional entertainment component equipment.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

In the field of isolation equipment, much attention has been directed toward minimizing the mechanical vibrations to which entertainment system components are subjected. Thus, an important objective of isolation equipment is to prevent the mechanical vibrations inherent in many devices from contaminating the performance capability of electronic and mechanical components. Examples of entertainment system components include electronic devices such as compact disk players, laser disk players, synthesizers, amplifiers, speakers, phonographs and the like. Mechanical components might include the moving elements of certain of the above mentioned electronic devices, for example, the spinning optical-video disk of the laser disk player or an antique cylinder phonograph.

In order to minimize the degradation of performance of an entertainment system component, it is necessary to dissipate the mechanical vibrations which are generated both internal and external to the entertainment system component. Mechanical vibrations generated by the entertainment system component include, for example, the inertial vibrations generated by the spinning 12" diameter optical-video disk of the laser disk player. External mechanical vibrations are continuously directed toward the entertainment system component from a myriad of sources including, for example, passing foot traffic. Therefore, a continuing problem is the necessity to dissipate both the internally and externally generated mechanical vibrations. Other associated problems include the need to minimize the transmission of mechanical vibrations generated internally by system components, such as speakers, through adjacent floors and walls. Further, stabilizing cabinet structures which house system components is desirable in order to minimize transmission of the mechanical vibrations to the cabinet and adjacent structures.

A solution to these problems has been evasive. For example, employing materials having shock-absorbing properties such as rubber, plastic or spring mounts provides only limited dissipating capability. This is the case because the material must also function as a mount to support the system component and therefore, must be of moderate density. Another example includes the use of cone-shaped mechanical diodes. The broad base of the diode is placed adjacent to the component for transmitting internally generated vibrations through the cone and out the narrow base. Externally generated mechanical vibrations can not pass through the narrow base to the system component, thus providing some protection. However, the mechanical diode can only transmit energy, not dissipate it and thus is only moderately effective.

Other examples of attempts to eliminate mechanical vibrations in entertainment system components include the use of mass loading devices, aerial suspension techniques, component clamping devices and anti-vibration weights. Mass loading devices utilize, for example, plates comprised of lead or a combination of lead, steel or medium density fiber board. The mass loading device is placed beneath the entertainment system component to absorb mechanical vibrations. The high density plates, particularly those alloyed with steel tend not to dissipate the mechanical vibrations. Aerial suspension of system components from overhead structures have been employed in an attempt to avoid vibration problems. Suspended system components exhibit a certain level of inconvenience and do not necessarily provide isolation from internally and externally generated mechanical vibrations. Further, fine tuning of the aerial suspension mechanism is required to avoid the spring properties of the suspension lines from interfering with the dominate mechanical resonant frequency structure of the system component.

The effect of the chassis clamping device is to alter the dominate resonant frequency of the system component. However, the mechanical vibrations are not prevented or dissipated and are therefore, transmitted into and out of the entertainment system component. Thus, this device provides the entertainment system component with little protection. Anti-vibration weights are placed on top of the entertainment system component for controlling chassis vibration. However, externally generated mechanical vibrations are permitted to enter subjecting the system component to potential damage. Unfortunately, the problems associated with dissipation of mechanical vibrations generated both internal and external to the entertainment system component continue to exist without a viable solution.

Thus, there is a need in the art for an improvement in isolation equipment for isolating an entertainment system component from mechanical vibrations to prevent degradation of performance of the system component.

SUMMARY OF THE INVENTION

The need in the art is addressed by the isolation platform of the present invention. The invention is an isolation platform for use with an entertainment system component having a plinth for supporting the entertainment system component and a granular vibration absorption medium for dissipating mechanical vibrations. The granular vibration absorption medium is in communication with the plinth for isolating the entertainment system component from mechanical vibrations. A base structure is provided for containing the granular vibration absorption medium. The isolation platform functions to isolate the entertainment system component from mechanical vibrations to prevent degradation of performance of the entertainment system component.

In a preferred embodiment, the base structure includes a plurality of shock-absorbing support feet for absorbing mechanical vibrations. A gap is located between the plinth and the base structure for minimizing the transfer of mechanical vibrations between the plinth and the base structure. The gap is filled with the granular vibration absorption medium.

Figure 1:
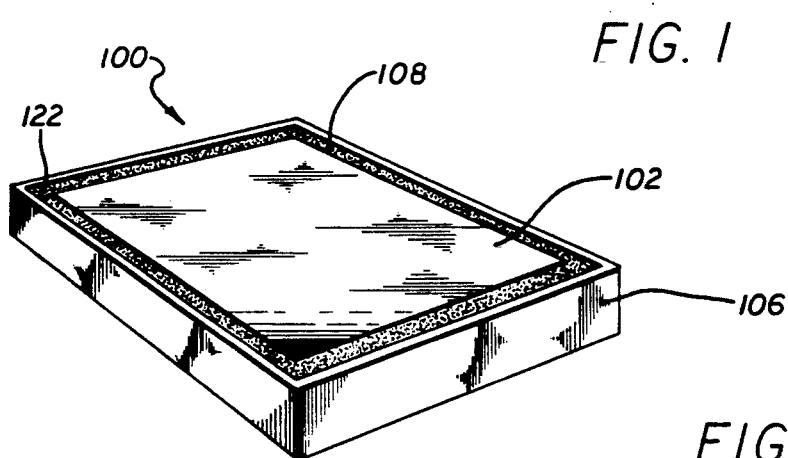
FIG. 1 is a perspective view of an isolation platform for use with an entertainment system component in accordance with the present invention showing a plinth positioned within a base structure.
Figure 2:
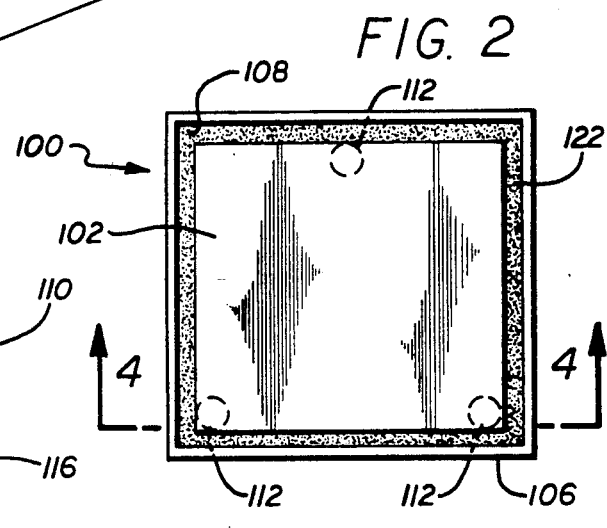
Figure 3:
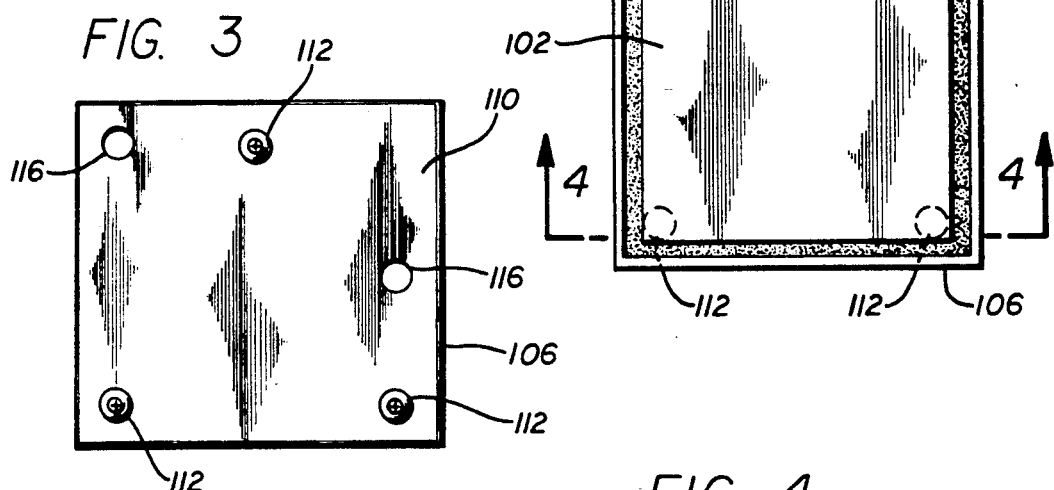
Figure 4:
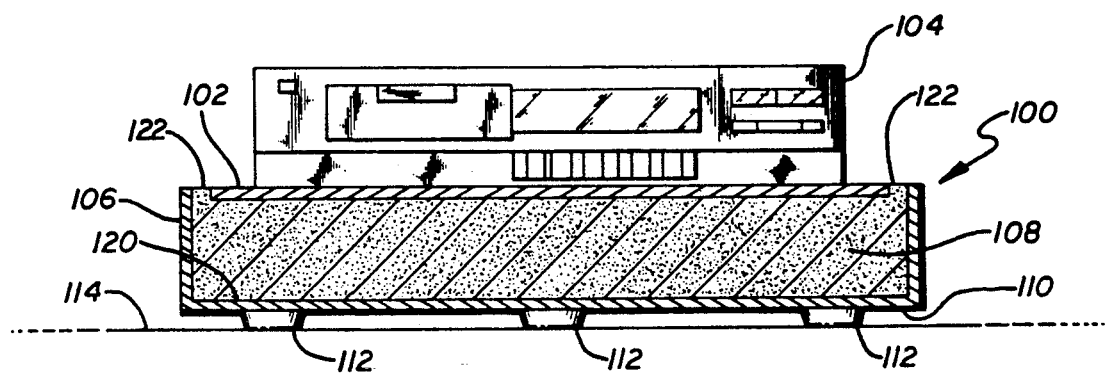

FIG. is a top planar view of the isolation platform of FIG. 1 showing the plinth mounted atop a granular vibration absorption medium within the base structure and a gap formed between the plinth and the bas structure;

FIG. 3 is a bottom planar view of the isolation platform of FIG. 1 showing a plurality of shock-absorbing support feet; and FIG. 4 is a cross-sectional view of the isolation platform taken along the line 4—4 of FIG. 2 and showing the relative position of the plinth mounted atop the granular vibration absorption medium within the base structure.

DESCRIPTION OF THE INVENTION

As shown in the drawings for purposes of illustration, the invention is embodied in an isolation platform 100 having a plinth 102 for supporting an entertainment system component 104 and a base structure 106 for containing a granular medium 108 which dissipates mechanical vibrations generated internal and external to the entertainment system component 104.

An important objective of isolation equipment is to prevent the mechanical vibrations inherent in many devices from contaminating the performance capability of electronic and mechanical components such as compact disk players, laser disk players, synthesizers, amplifiers, speakers, phonographs and the like. In order to minimize the degradation of performance of an entertainment system component, it is necessary to dissipate the mechanical vibrations which are generated both internal and external thereto. Therefore, a continuing problem is the necessity to dissipate both the internally and externally generated mechanical vibrations. Other associated problems include the need to minimize transmission of mechanical vibrations generated internally by system components, such as speakers, through adjacent floors and walls. Further, stabilizing cabinet structures which house system components is desirable.

Attempts to eliminate mechanical vibrations in entertainment system components include the use of shock-absorbing materials, cone-shaped mechanical diodes, mass loading devices, aerial suspension techniques, component clamping devices and antivibration weights. Notwithstanding this effort, there is a need in the art for an improvement in isolation equipment which dissipates the mechanical vibrations to which an entertainment system component is subjected.

In accordance with the present invention, the plinth 102 and the granular medium 108 cooperate to dissipate mechanical vibrations generated both internal and external to the entertainment system component 104 and to significantly reduce the degradation of performance of the system component 104 by providing isolation from the mechanical vibrations. Moreover, the isolation platform 100 attenuates the transmission of the mechanical vibrations through adjacent walls and floors, serves to level and stabilize the system component 104 to permit improved mechanical performance, is simple in construction and reliable in use, is economic and portable and is compatible with other known vibration dampening devices of the past.

The isolation platform 100 is comprised of the base structure 106 as is shown in FIGS. 1–4. The function of the base structure is to act as a container for containing and supporting the granular medium 108 and the plinth 102. The base structure is shown as rectangular in shape in FIGS. 1–4 but can assume other shapes including, for example, triangular, circular or square. The base structure can be, for example, 21" in length, 19½" deep and 3½" in height. These dimensions have been found to be suitable for accommodating the base surface area of most system components employed in home entertainment systems. However, a base structure having larger dimensions might be more suitable for system components utilized in professional entertainment systems.

The bottom 110 of the base structure 106 includes a plurality of support feet 112 as shown in FIG. 3. The support feet 112 are positioned on the bottom 110 so as to form a plane for supporting the base structure 106. Three support feet 112 are shown in a triangular configuration in FIGS. 2 and 3 for illustration purposes only. A plurality of receptacles 116 are formed in the bottom 110 of the base structure 106 for accommodating other configurations for the support feet 112.

Since the isolation platform 100 is employed for isolating an entertainment system component 104 from mechanical vibrations, the base structure 106 is normally positioned on a flat surface 114 such as a shelf or table as shown in FIG. 4. Therefore, the plurality of support feet 112 also function to provide mechanical vibration decoupling between the flat surface 114 and the system component 104. The support feet 112 can be comprised of, for example, a shock-absorbing material such as rubber or other synthetic material. Therefore, the support feet 112 are also useful in preventing cosmetic damage to the top surface of the flat surface 114.

The granular medium 108 is a vibration dissipating medium and can be any granular substance, including sand. However, in other embodiments within the scope of the present invention, the granular medium 108 can be replaced with any suitable viscous liquid housed within a flexible container. The granular medium 108 is placed on the floor 120 within the confines of the rectangular base structure 106 as shown in FIG. 4. The inside height of the base structure can be, for example, 2½". The base structure 106 is filled with the granular medium 108 and the plinth 102 rests on the granular medium. The depth of the granular medium within the base structure 106 is that depth which permits the top of the plinth 102 to be positioned even with the top of the base structure as shown in FIGS. 1 and 4. The main function of the granular medium 108 is to absorb and dissipate mechanical vibrations generated internal and external to the entertainment system component 104.

The plinth 102 is positioned on the granular medium 108. The dimensions of the plinth 102 are smaller than those of the base structure 106 so that the plinth lies within and even with the top of the base structure as shown in FIGS. 1 and 4. Because of this difference in dimensions, a gap 122 exists along the entire outer border of the plinth 102 between the base structure 106 and the plinth. The ga 122 functions to accommodate the placement of the plinth 102 within and even with the top of the base structure. The gap 122, which is filled with the granular medium 108, further assists in minimizing the transfer of mechanical vibrations between the base structure 106 and the plinth 102.

A main function of the plinth 102 is to support the weight of the system component 104 and to serve as a conduit to pass mechanical vibrations from the system component 104 to the granular medium 108. The granular medium 108 is usually an amorphous medium which assumes the shape of the base structure 106. Thus, the granular medium 108 can be repositioned by manipulating the plinth 102. Therefore, the plinth also serves to provide a level surface for the system component 104 to rest upon. The plinth 102 and the base structure 106 can be comprised of any of a plurality of construction materials. Examples of such materials include, but are not limited to, wood products, plastic, light weight metal such as aluminum, the construction material identified by the trademark masonite or even stone products. The preferred construction material is a wood product, for example, ¾" medium density fiber board.

In operation, the isolation platform 100 functions in the following manner. Initially, the base structure 106 is filled with the granular medium 108 to a height which permits the plinth 102 to be level with the top of the base structure. The plinth can then be utilized to level the surface of the granular medium 108 and is then positioned onto the granular medium. Thereafter, the isolation platform 100 is seated via the plurality of support feet 112 onto the flat surface 114. Then, the entertainment system component 104 is placed upon the leveled plinth 102 as is shown in FIG. 4. The combination of the plinth and the granular medium 108 function to provide a level surface for the system component 104 and to dissipate mechanical vibrations and shock waves traveling between the system component 104 and the base structure 106. Additionally, the weight of the base structure 106 and the granular medium 108 also serves to stabilize the flat surface 114 and thus the system component 104 against vibration as a result of the disturbance.

Disturbances creating mechanical vibrations are commonly generated external to the system component 104. Examples of such disturbances include local foot traffic, slamming doors and local vehicle traffic. The externally generated mechanical vibrations travel through structural components (such as floors and walls) and through air and are transmitted to the flat surface 114 supporting the isolation platform 100 and the system component 104. The plurality of support feet 112 function to absorb a portion of the shock wave accompanying the disturbance. The remainder of the shock wave is transmitted to the base structure 106 and the granular medium 108. The granular medium is loosely packed which permits the remainder of the shock wave to be absorbed and dissipated therein. Thus, the shock wave is not transmitted to the plinth 102 so that the system component 104 is isolated from the externally generated mechanical vibrations associated with the original disturbance.

Disturbances creating mechanical vibrations are also generated within the system component 104. Examples of such disturbances include the spinning optical-video disk located within a laser disk player and the background bass produced by an audio speaker. The inertia of the spinning disk and the background bass of the audio speaker each create mechanical vibrations which, as in externally generated mechanical vibrations, can result in the degradation of performance of the system component 104. The internally generated mechanical vibrations are transmitted from the structure of the system component 104 to the plinth 102. The plinth serves as a conduit for the transmission of the internally generated mechanical vibrations to the granular medium 108. The loosely packed granular medium permits the mechanical vibrations to be absorbed and dissipated. Notwithstanding the internal or external origin of the disturbance creating the mechanical vibrations, the isolation platform 100 prevents the degradation of performance of electronic and mechanical system components 104.

Disturbances creating mechanical vibrations generated within the system component 104 can be transmitted to locations external to the system component. An appropriate example is that of the audio speaker. The mechanical vibrations created by the background bass of the audio speaker can travel through the air, the walls and the floor. The mechanical vibrations in the walls and floor are often annoying to other individuals. However, when the audio speaker is positioned upon the isolation platform 100, the internally generated mechanical vibrations are transmitted through the plinth 102 and then absorbed and dissipated in the granular medium 108 as explained above.

From the foregoing, it will be appreciated that the isolation platform 100 of the present invention dissipates the mechanical vibrations to which the entertainment system component 104 is subjected. Thus, the degradation of performance of the system component 104 is significantly reduced. Further, the isolation platform 100 attenuates the transmission of mechanical vibrations through adjacent walls and floors and serves to level and stabilize the system component to improve mechanical performance. Further, the isolation platform is simple in construction, reliable in use, is economic, portable and is compatible with other known vibration dampening devices such as shock-absorbing mounts.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. An isolation platform for use with an entertainment system component comprising, in combination:

means for supporting said entertainment system component, said supporting means having a continuous solid surface;

granular means for dissipating mechanical vibrations, said granular dissipating means in direct contact with and supporting said supporting means for isolating said system component from mechanical vibrations; and means for containing said granular dissipating means, said isolation platform isolating said system component from mechanical vibrations to prevent degradation of performance of said system component.

2. The isolation platform of claim 1 wherein said supporting means comprises a plinth.

3. The isolation platform of claim 2 wherein said plinth provides a level surface for positioning said system component to provide improved mechanical performance of said system component.

4. The isolation platform of claim 1 wherein said granular dissipating means comprises a granular vibration absorption medium.

5. The isolation platform of claim 1 further including a plurality of shock-absorbing support feet for absorbing mechanical vibration.

6. The isolation platform of claim 1 wherein said containing means comprises a base structure.

7. The isolation platform of claim 1 further including a gap located between said supporting means and said containing means for minimizing the transfer of mechanical vibrations between said supporting means and said containing means.

8. The isolation platform of claim 7 wherein said gap is filled with a granular vibration absorption medium.

9. An isolation platform for use with an entertainment system component comprising, in combination:
- a plinth for supporting said entertainment system component, said plinth having a continuous solid surface;
- granular means for dissipating mechanical vibrations, said granular dissipating means in direct contact with and supporting said plinth for isolating said system component from mechanical vibrations; and
- a base structure for containing said granular dissipating means,
- said isolation platform isolating said system component from mechanical vibrations to prevent degradation of performance of said system component.

10. An entertainment component isolation system comprising, in combination:
- an entertainment component;
- means for supporting said entertainment component, said supporting means having a continuous solid surface;
- granular means for dissipating mechanical vibrations, said granular dissipating means in direct contact with and supporting said supporting means for isolating said entertainment component from mechanical vibrations; and
- means for containing said granular dissipating means,
- said isolation system isolating said entertainment component from mechanical vibrations to prevent degradation of performance of said entertainment component.

11. The entertainment component isolation system of claim 10 wherein said containing means further includes a plurality of shock-absorbing support feet for absorbing mechanical vibration.

12. The entertainment component isolation system of claim 10 further including a gap located between said supporting means and said containing means for minimizing the transfer of mechanical vibrations between said supporting means and said containing means.

13. The entertainment component isolation system of claim 12 wherein said gap is filled with a granular vibration absorption medium.

14. The entertainment component isolation system of claim 10 wherein said supporting means comprises a plinth and said containing means comprises a base structure.

* * * * *